United States Patent
Van der Waal et al.

(10) Patent No.: US 11,102,989 B2
(45) Date of Patent: Aug. 31, 2021

(54) SYSTEM FOR PLACEMENT OF A SUPPLY OF POULTRY FRONT HALVES IN AN ORDERED SEQUENCE IN A PROCESSING LINE

(71) Applicant: Meyn Food Processing Technology B.V., Oostzaan (NL)

(72) Inventors: Dirk Hermen Van der Waal, Oostzaan (NL); Peter Martin Andeweg, Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 271 days.

(21) Appl. No.: 16/361,668

(22) Filed: Mar. 22, 2019

(65) Prior Publication Data
US 2019/0297903 A1 Oct. 3, 2019

(30) Foreign Application Priority Data

Mar. 28, 2018 (NL) .................................... 2020679

(51) Int. Cl.
*A22B 7/00* (2006.01)
*A22C 21/00* (2006.01)

(52) U.S. Cl.
CPC .......... *A22C 21/0053* (2013.01); *A22B 7/002* (2013.01); *A22B 7/003* (2013.01); *A22B 7/005* (2013.01); *A22C 21/0046* (2013.01)

(58) Field of Classification Search
CPC ...... A22B 7/003; A22B 7/005; A22C 21/0053
USPC ................. 452/179, 180, 182, 183
See application file for complete search history.

(56) References Cited

U.S. PATENT DOCUMENTS

| | | | | |
|---|---|---|---|---|
| 3,979,793 A | * | 9/1976 | Hazenbroek | A22C 21/06 452/118 |
| 4,458,380 A | * | 7/1984 | Tendick | A22C 21/00 452/174 |
| 4,619,017 A | * | 10/1986 | Simmons | A22C 21/00 452/168 |
| 4,899,421 A | * | 2/1990 | Van Der Eerden | A22C 21/0061 452/106 |
| 5,913,720 A | * | 6/1999 | Scott | A22C 21/06 452/120 |
| 6,062,972 A | | 5/2000 | Visser | |

(Continued)

FOREIGN PATENT DOCUMENTS

EP 2046131 4/2009
WO WO 2009/002153 12/2008

OTHER PUBLICATIONS

PCT Search Report for application NL 2020679, dated May 5, 2018.

*Primary Examiner* — David J Parsley
(74) *Attorney, Agent, or Firm* — Dority & Manning, P.A.

(57) ABSTRACT

System for placement of a supply of poultry front halves in a processing line equipped with a train of movable carriers for the poultry front halves. Exemplary embodiments may include a train of receptacles provided and movable in a conveyor line, wherein the receptacles are equipped to receive the front halves at an input station of the system, and the conveyor line is equipped to move the receptacles with the poultry front halves received therein from the input station towards and along the processing line with the carriers. The receptacles can be equipped to transfer the poultry front halves onto the carriers in the processing line and may be equipped with a breast support plate, a bottom plate and upstanding inserts.

15 Claims, 9 Drawing Sheets

(56) References Cited

U.S. PATENT DOCUMENTS

| | | | |
|---|---|---|---|
| 6,371,843 B1 * | 4/2002 | Volk | A22B 5/0094 |
| | | | 452/106 |
| 2,046,131 A1 | 1/2012 | Van Den Nieuwelaar et al. | |
| 8,540,556 B2 | 9/2013 | Hiddink et al. | |
| 10,212,951 B2 * | 2/2019 | Ouellet | A22C 21/0038 |

* cited by examiner

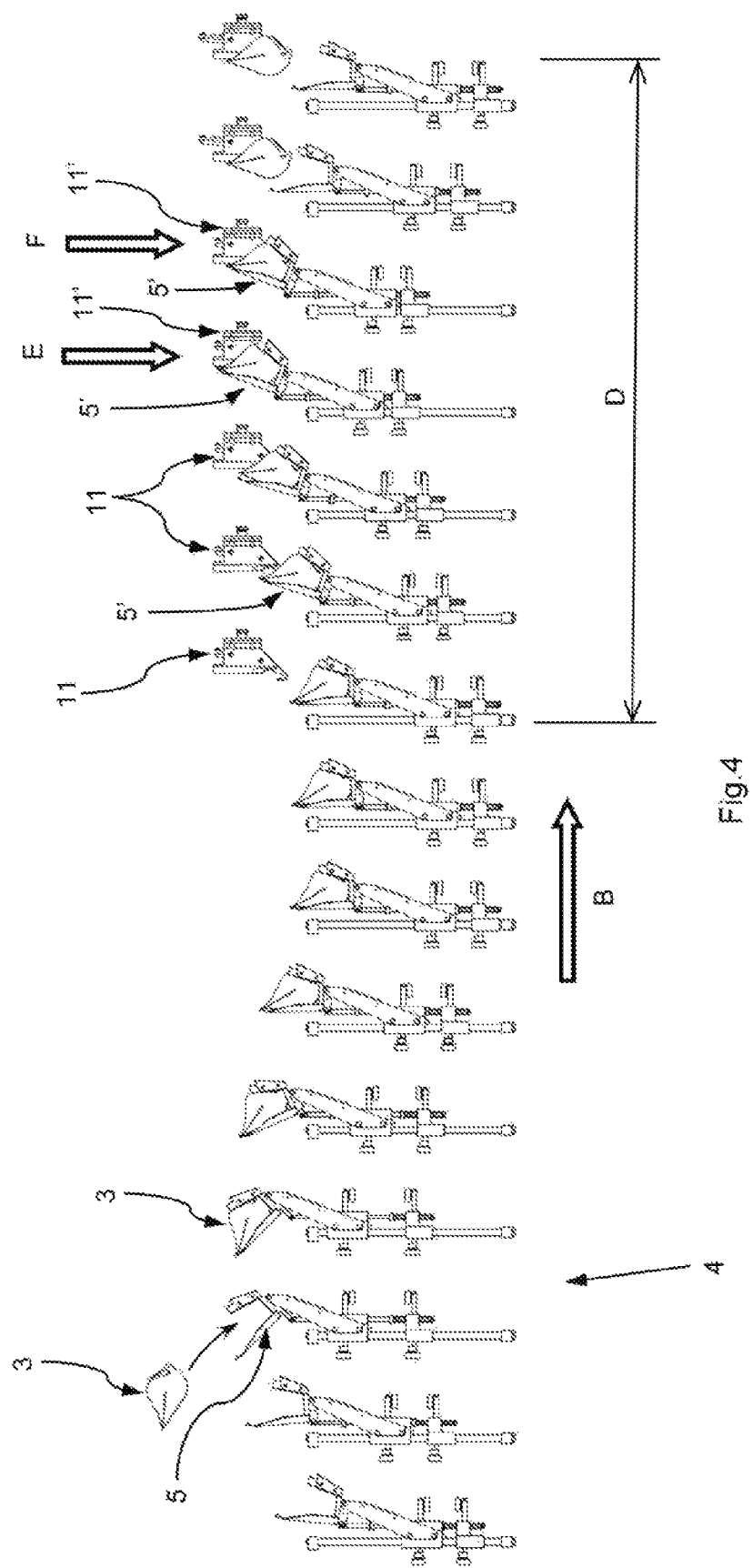

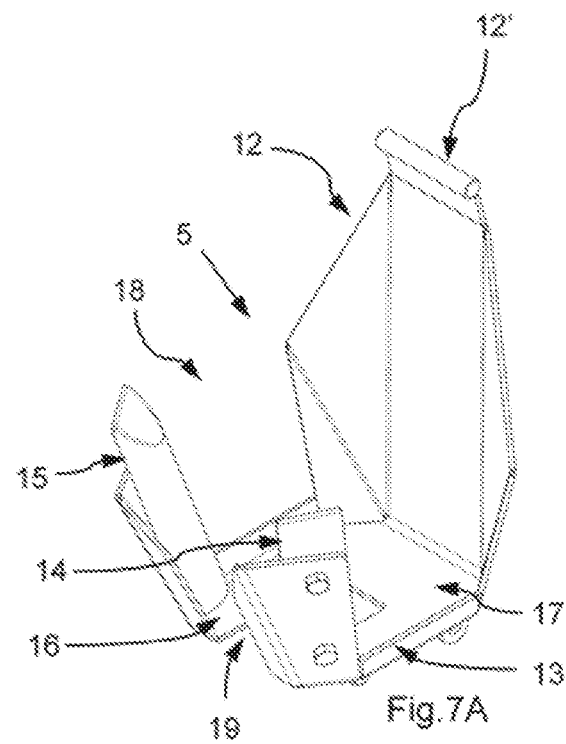
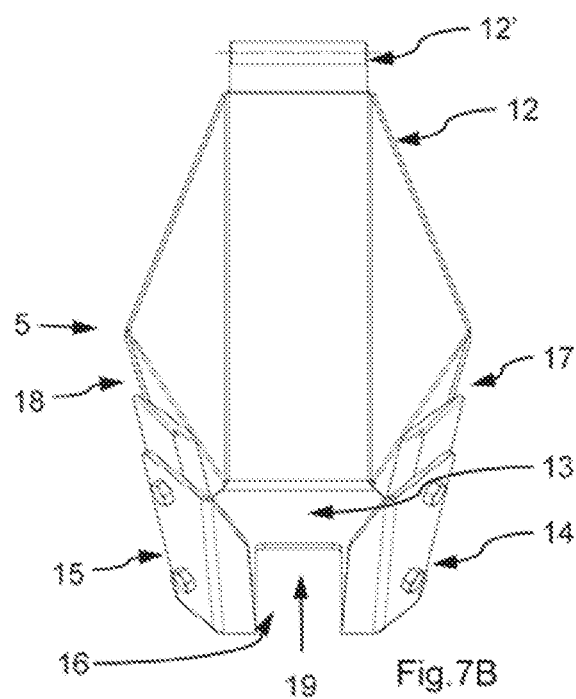

SYSTEM FOR PLACEMENT OF A SUPPLY OF POULTRY FRONT HALVES IN AN ORDERED SEQUENCE IN A PROCESSING LINE

PRIORITY STATEMENT

The present application claims priority under 35 U.S.C. § 119 to Dutch Application No. 2020679, filed Mar. 28, 2018.

FIELD OF THE INVENTION

The subject matter of the present disclosures relates generally to a system for placement of a supply of poultry front halves in a processing line.

BACKGROUND OF THE INVENTION

A system for poultry placement is indicated in EP-B-2 162 007. This conventional system is intended to operate on both breast caps and front halves and proposes to supply the carcass parts with a conveyor belt, a vibrating trough, a walking beam, a chute, or a tray. The supplied carcass parts are then picked up by an operator and placed by hand on a feed plate. From the feed plate the carcass part is then positioned manually or by mechanical means on an application unit which moves the carcass part in position on a carrier. The application unit is one of a train of application units moving in a conveying line parallel to a processing line in which a train of carriers for the carcass parts moves in a transport direction.

BRIEF DESCRIPTION OF THE INVENTION

In one exemplary aspect, embodiments of the invention can improve consistency and performance in handling of poultry front halves. This invention excludes the processing of breast caps.

In another exemplary aspect, embodiments of the invention can alleviate the manual tasks of the operator that is handling the poultry front halves.

In another exemplary aspect, embodiments of the invention can improve the ergonomics of the manual tasks of the operator.

In still another exemplary aspect, embodiments of the invention can streamline the processing of the poultry front halves in order to make processing rates of poultry of approximately 7000 pieces per hour possible.

These objects and other advantages that may become apparent from the following disclosure are provided by the system and method according to one or more of the appended claims.

According to a first exemplary embodiment the invention, each receptacle can be equipped with a breast support plate. Such embodiment may include a bottom plate and upstanding inserts rising up from the bottom plate distant from the breast support plate and defining a first slot between the inserts for receiving a backbone of the poultry front halve received in the receptacle. Between each of the inserts and the breast support plate, second slots may be provided as room for breast meat of the poultry front half received in the receptacle. This construction of the receptacle can provide for an accurate and consistent positioning of the poultry front halves with a high degree of repeatability, which makes subsequent placement on the carriers of the processing line an easy task.

In another exemplary aspect, the bottom plate is provided with a third slot that connects with the first slot between the inserts, wherein the third slot is arranged to receive a neck of the poultry front half. This can make the receptacle less sensitive to variations in size of the poultry front half.

In another exemplary aspect of the invention, the input station of the system may include a transport line for supply of the front halves. The conveyor line with the receptacles is provided at least in part adjacent to and at least partly below the transport line for supply of the front halves, wherein at the input station the receptacles are slanted towards the transport line to assist in sliding of the poultry front halves from the transport line down into the receptacles. This can greatly reduce the effort required from the operators to move the supplied poultry front halves into the receptacles.

In another exemplary aspect, at the input station where the receptacles are slanted towards the transport line, the breast support plate engages a frame of the transport line to be closer to the transport line than the inserts of the receptacles. This secures that the positioning of the poultry front halves in the receptacles is exactly attuned to the requirements of the subsequent positioning of the poultry front halves on the carriers in the processing line.

According to another exemplary embodiment of the invention, the system can include a first camera for establishing a position and orientation of the poultry front halves on the transport line. The system can further include a pick and place robot connected to the camera for picking up the poultry front halves in accordance with the position and orientation of the poultry front halves as monitored with the camera, and placing the poultry front halves with a predefined orientation in the receptacles of the conveyor line with the breast of the poultry front halves resting against the breast support plate of the receptacles. This can further reduce or even excludes the labour required from the operator in handling the poultry front halves.

In another exemplary aspect, each carrier in the processing line is oriented vertically with an up-and-down movable mounting hook at a lower part of the carrier. This up-and-down movable mounting hook can be instrumental in securing the poultry front half on the carrier as will be explained hereinafter.

Each carrier in the processing line may have a corresponding receptacle in the conveyor line, which receptacle is movable up-and-down and tiltable so as to arrange that the receptacle with the poultry front half received therein is during operation moved from a position below the corresponding carrier in the processing line to an upper and highest position. During such movement of the receptacle from a position below the carrier to the upper and highest position, the receptacle is tilted towards the carrier so as to engage the poultry front half received in such receptacle with the carrier, whereafter the receptacle is lowered and the poultry front half is pressed down on the mounting hook of the carrier. This can completely automate the task of placing the poultry front halves on the carriers in the processing line, which accordingly can be done now with high precision and consistency and at high speed.

After the receptacle is lowered and the poultry front half is pressed down on the mounting hook of the carrier, the mounting hook may be moved upwards into a final position in which it clamps the poultry front half on the carrier.

The skilled person is well aware of the way in which up-and-down movement and tilting of the mounting hook and each receptacle can be accomplished. Both the applicant and the proprietor of EP-B-2 162 007 (which together account for approximately 70% of the world market) employ for this purpose pre-established cam tracks that cooperate with cam rollers, which are provided on the receptacles to impart the required movement on the receptacles. This is mentioned in EP-B-2 162 007 (and in many other applications) and for sake of clarity not shown in EP-B-2 162 007. Likewise this disclosure dispenses showing of the cooperating cam tracks and cam rollers as being superfluous for the skilled person but refers as an example to EP-B-2 823 713, which is deemed incorporated in the disclosure of this invention in its entirety by reference.

The breast support plate has an upper portion, which can be inclined towards the upstanding inserts opposite to the breast support plate. This inclined upper portion can be useful in pressing the poultry front half down on the mounting hook of the carrier.

Beneficially the processing line with the train of carriers and the conveyor line with the train of receptacles can be synchronized to move at the same speed.

Beneficially, in additional exemplary aspects, further the system can be provided with a second camera to monitor whether a carrier in the processing line is empty or supports a poultry front half or a remainder of a poultry front half. The system can be arranged to interrupt up-and-down movement of a corresponding receptacle in the conveyor line to prevent that the poultry front half in such receptacle is moved into mounting position on the corresponding carrier, if the second camera detects that the carrier is not empty and already supports a poultry front half or a remainder of a poultry front half. This can for instance be embodied in a way similar as to what is disclosed in EP 2823713.

In another exemplary aspect, the invention includes a method for placement of a supply of poultry front halves in a processing line equipped with a train of movable carriers for the poultry front halves. The method can include receiving the front halves in receptacles that are moving in a conveyor line, and moving the receptacles with the poultry front halves towards and along the processing line with the train of carriers, followed by transferring the poultry front halves onto the carriers in the processing line. This exemplary method can include supplying the front halves with a transport line to an input station, slanting the receptacles towards the transport line, and sliding the poultry front halves from the transport line down into the receptacles.

In another aspect, this exemplary method can include establishing a position and orientation of the poultry front halves on the transport line, picking up the poultry front halves in accordance with the position and orientation of the poultry front halves on the transport line, and placing the poultry front halves with a predefined orientation in the receptacles of the conveyor line, with the breast of the poultry front halves resting against the breast support plate of the receptacles.

In another exemplary aspect of the invention the method can provide that each carrier in the processing line is oriented vertically with a mounting hook at a lower part of the carrier, and provides that for each carrier in the processing line a corresponding receptacle in the conveyor line is moved up-and-down and tilted so as to arrange that the receptacle with the poultry front half received therein is moved from a position below the corresponding carrier in the processing line to an upper and highest position, wherein during this movement of the position below the carrier to the upper and highest position, the receptacle can be tilted towards the carrier to arrange that the poultry front half received in such receptacle engages the carrier, whereafter the receptacle is lowered and the poultry front half is pressed down on the mounting hook of the carrier.

In another exemplary aspect, after the receptacle is lowered and the poultry front half is pressed down on the mounting hook of the carrier, the mounting hook is moved upwards into a final position in which it clamps the poultry front half on the carrier.

During lowering of the receptacle, wherein the poultry front half is pressed on the mounting hook of the carrier, the mounting hook may pierce through a membrane connecting a keel bone and a wishbone of the poultry front half. This can promote that the poultry front half is reliably secured in position on the carrier, wherein it can receive further treatment and processing.

The exemplary method can include monitoring whether a carrier in the processing line is empty or supports a poultry front half or a remainder of a poultry front half, and interrupting operation of a corresponding receptacle in the conveyor line to prevent that the poultry front half in such receptacle is moved into mounting position on the carrier— when the carrier is not empty and already supports a poultry front half or a remainder of a poultry front half.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

The invention will hereinafter be further elucidated with reference to the drawing of an exemplary embodiment of an apparatus according to the invention that is not limiting as to the appended claims.

FIG. 4 shows exemplary sequential movements of the receptacle while it moves through the system from a position adjacent to the transport line to a position wherein it transfers a poultry front half to the conveyor line;

FIGS. 7A and 7B show the exemplary receptacle for receiving a poultry front half in an isometric oblique view and in a frontal view.

Whenever in the figures the same reference numerals are applied, these numerals refer to the same parts.

DETAILED DESCRIPTION OF THE INVENTION

In an exemplary aspect, the present invention provides a system for placement of a supply of poultry front halves in a processing line, which may be equipped with a train of movable carriers for the poultry front halve. The system can include a train of receptacles that are movable in a conveyor line. The receptacles can be equipped to receive the front halves at an input station of the system. The conveyor line may be equipped to move the receptacles with the poultry front halves received therein from the input station towards and along the processing line with the carriers. The receptacles can be equipped to transfer the poultry front halves onto the carriers in the processing line.

For purposes of describing the invention, reference now will be made in detail to embodiments and/or methods of the invention, one or more examples of which are illustrated in or with the drawings. Each example is provided by way of explanation of the invention, not limitation of the invention. In fact, it will be apparent to those skilled in the art that various modifications and variations can be made in the present invention without departing from the scope or spirit of the invention. For instance, features or steps illustrated or described as part of one embodiment, can be used with another embodiment or steps to yield a still further embodiments or methods. Thus, it is intended that the present invention covers such modifications and variations as come within the scope of the appended claims and their equivalents.

Figure 1A:
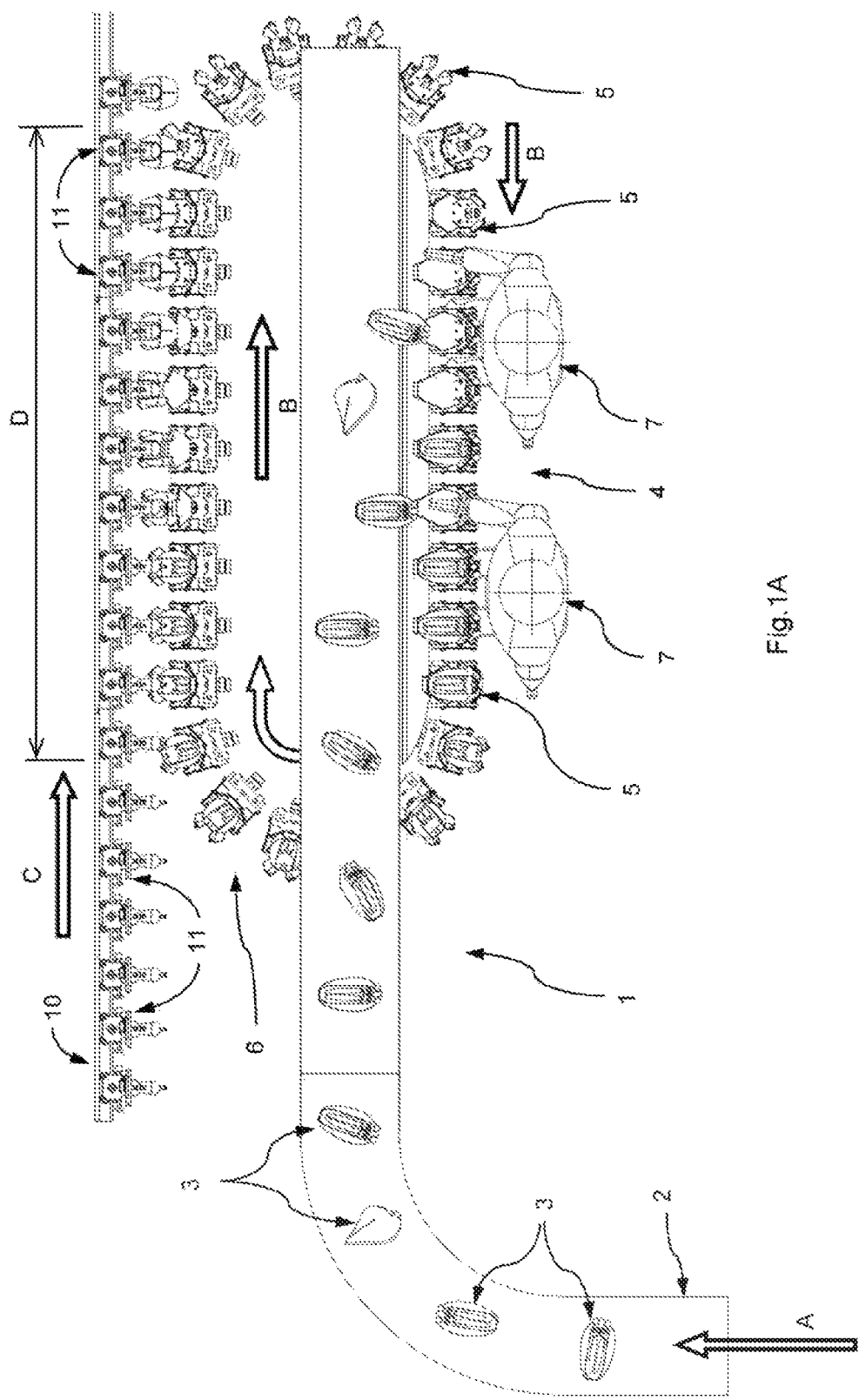
FIG. 1A shows in top view a first exemplary embodiment of a system according to the invention.
Figure 1B:
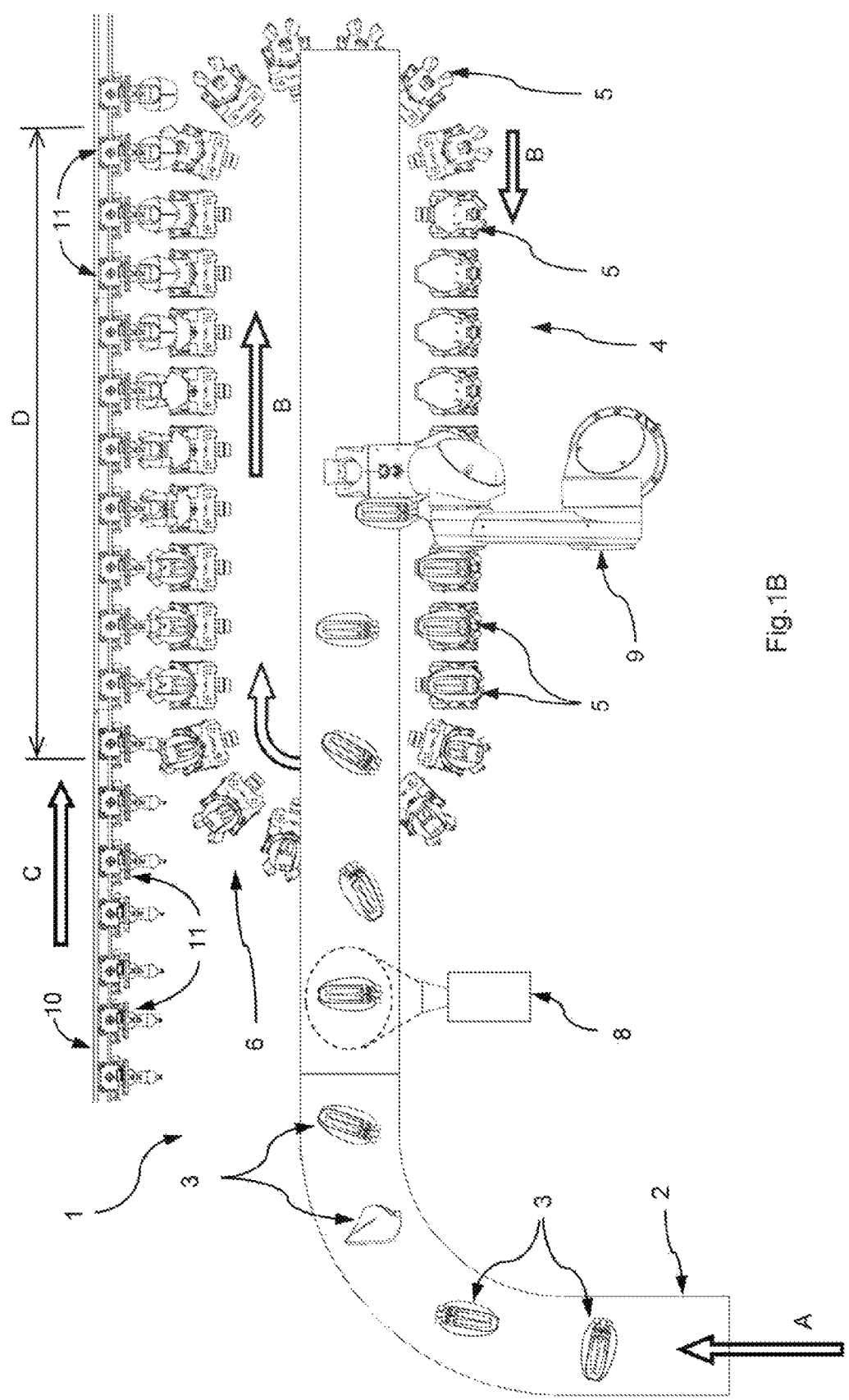
FIG. 1B shows in top view a second exemplary embodiment of a system according to the invention.

With reference first to FIG. 1A and FIG. 1B, an exemplary system 1 is shown, which is embodied with a transport line 2 that moves in a direction indicated with arrow A for supply of poultry front halves 3 to an input station 4. In the input station 4 the poultry front halves 3 are placed in receptacles 5 that form part of a train of receptacles of a conveyor line 6 that moves in a direction according to arrow B.

In this exemplary embodiment, the receptacles 5 are slanted towards the transport line 2 to assist in sliding the poultry front halves 3 from the transport line 2 sideways down into the receptacles 5. FIG. 1A relates to an exemplary embodiment in which the poultry front halves 3 are manually placed in the receptacles 5 by an operator or operators 7. FIG. 1B on the other hand shows an exemplary embodiment of a completely automated system without operators, wherein a first camera 8 establishes a position and orientation of the poultry front halves 3 on the transport line 2, and further includes a pick and place robot 9 connected to the camera 8 for picking up the poultry front halves 3 in accordance with the position and orientation of the poultry front halves 3 as monitored with the camera 8. FIG. 1B also depicts placing the poultry front halves 3 with a predefined orientation in the receptacles 5 of the conveyor line 6. In this manual or automated process the poultry front halves 3 come to rest with the breast against a breast support plate (to be mentioned hereinafter with reference to FIGS. 7A and 7B) of the receptacles 5.

Exemplary system 1 of the invention can transfer the receptacles 5 in the conveyor line 6 from the input station 4 towards and move alongside a processing line 10 with a train of carriers 11 that move in a direction according to arrow C. When the receptacles 5 of the conveyor line 6 are in proximity of the carriers 11 in the processing line 10, the receptacles 5 are arranged to transfer the poultry front halves 3 onto the carriers 11 in the processing line 10.

Figure 3A:
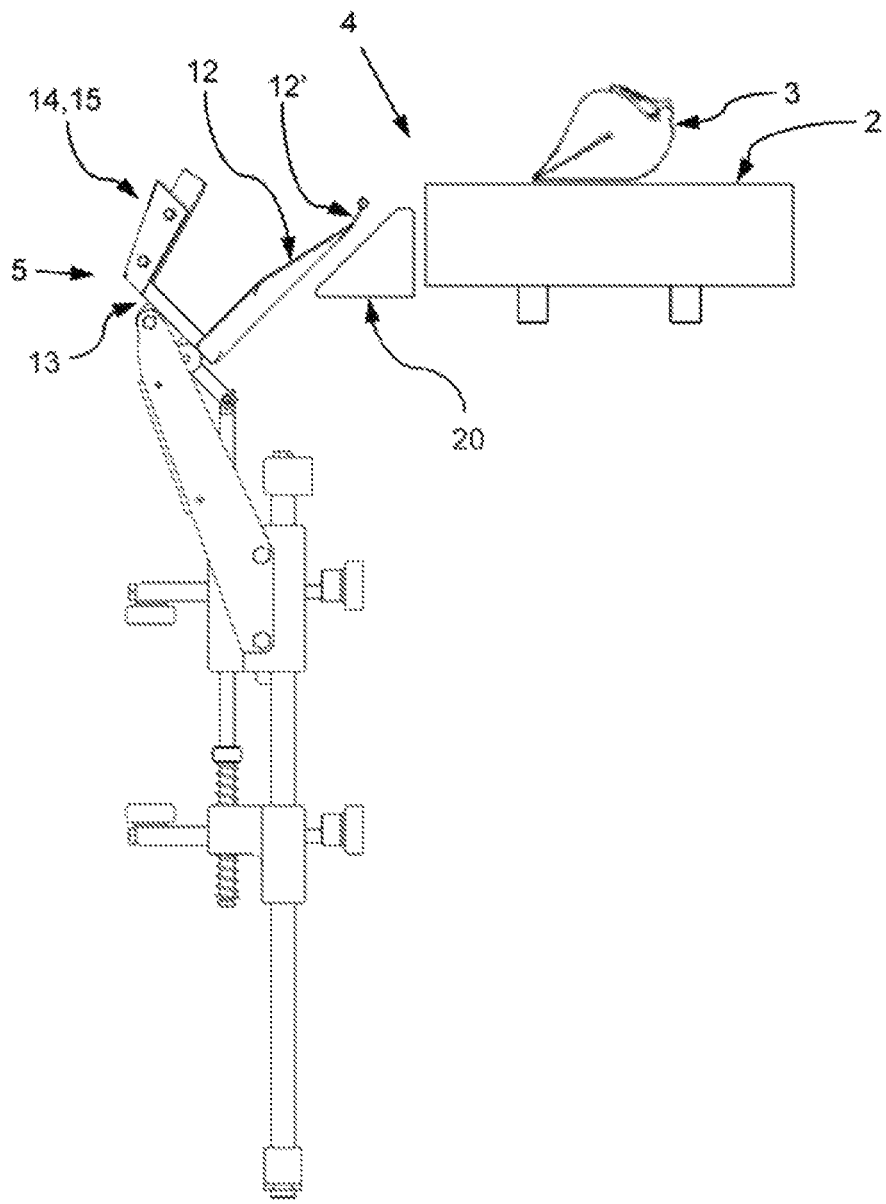
FIG. 3A shows a side view a receptacle slanted towards a transport line for supply of poultry front halves according to an exemplary aspect of the invention.
Figure 3B:
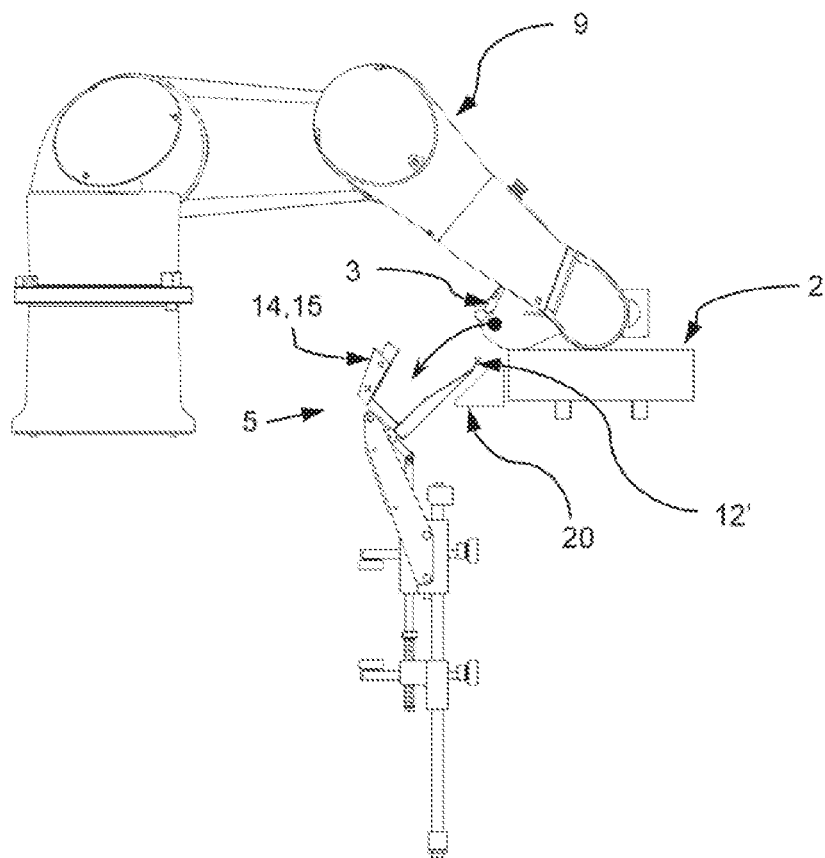
FIG. 3B shows the exemplary receptacle and transport line of FIG. 3A, completed with a robot for transferring a poultry front half from the transport line to the receptacle.

Turning now to FIGS. 7A and 7B, an exemplary receptacle 5 is shown as used in the conveyor line 6. Receptacle 5 is equipped with a breast support plate 12, a bottom plate 13 and upstanding inserts 14, 15 rising up from the bottom plate 13 distant from the breast support plate 12 and defining a first slot 16 between the inserts 14, 15 for receiving a backbone of the poultry front halve 3 to be received in the receptacle 5. Between each of the inserts 14, 15 and the breast support plate 12 second slots 17, 18 are provided on opposite sides of the bottom plate 13 for providing room for breast meat of the poultry front halve 3 to be received in the receptacle 5. The bottom plate 13 is provided with a third slot 19 that connects with the first slot 16 between the inserts 14, 15, which third slot 19 is arranged to receive a neck of the poultry front half 3 to be received in the receptacle 5. FIGS. 7A and 7B and more clearly also FIGS. 3A and 3B, show that the breast support plate 12 has an upper portion 12'—which is inclined towards the upstanding inserts 14, 15 opposite to the breast support plate 12.

As already mentioned with reference to FIG. 1A and FIG. 1B, the input station 4 of the system 1 includes a transport line 2 for supply of the front halves 3. FIG. 3A depicts that the conveyor line with the receptacles 5 is provided at least in part adjacent to and at least partly below the transport line 2 for supply of the front halves 3. The input station 4 the receptacles 5 are slanted towards the transport line 2 to assist in sliding of the poultry front halves 3 from the transport line 2 down into the receptacles 5. FIG. 3A relates to the embodiment of FIG. 1A wherein the moving of the poultry front halves 3 into the receptacles 5 is done manually by an operator or operators 7. FIG. 3B shows the situation in which the movement of the poultry front halves 3 into the receptacles 5 is done by a pick and place robot 9 as shown in FIG. 1B. Concerning both the exemplary embodiments of FIGS. 1A and 1B, the detailed FIGS. 3A and 3B show that at the input station 4—where the receptacles 5 are slanted towards the transport line 2—the breast support plate 12 engages a frame 20 of the transport line 2 so as to arrange that the breast support plate 12 is closer to the transport line 2 than the inserts 14, 15 of the receptacles 5.

Figure 2:
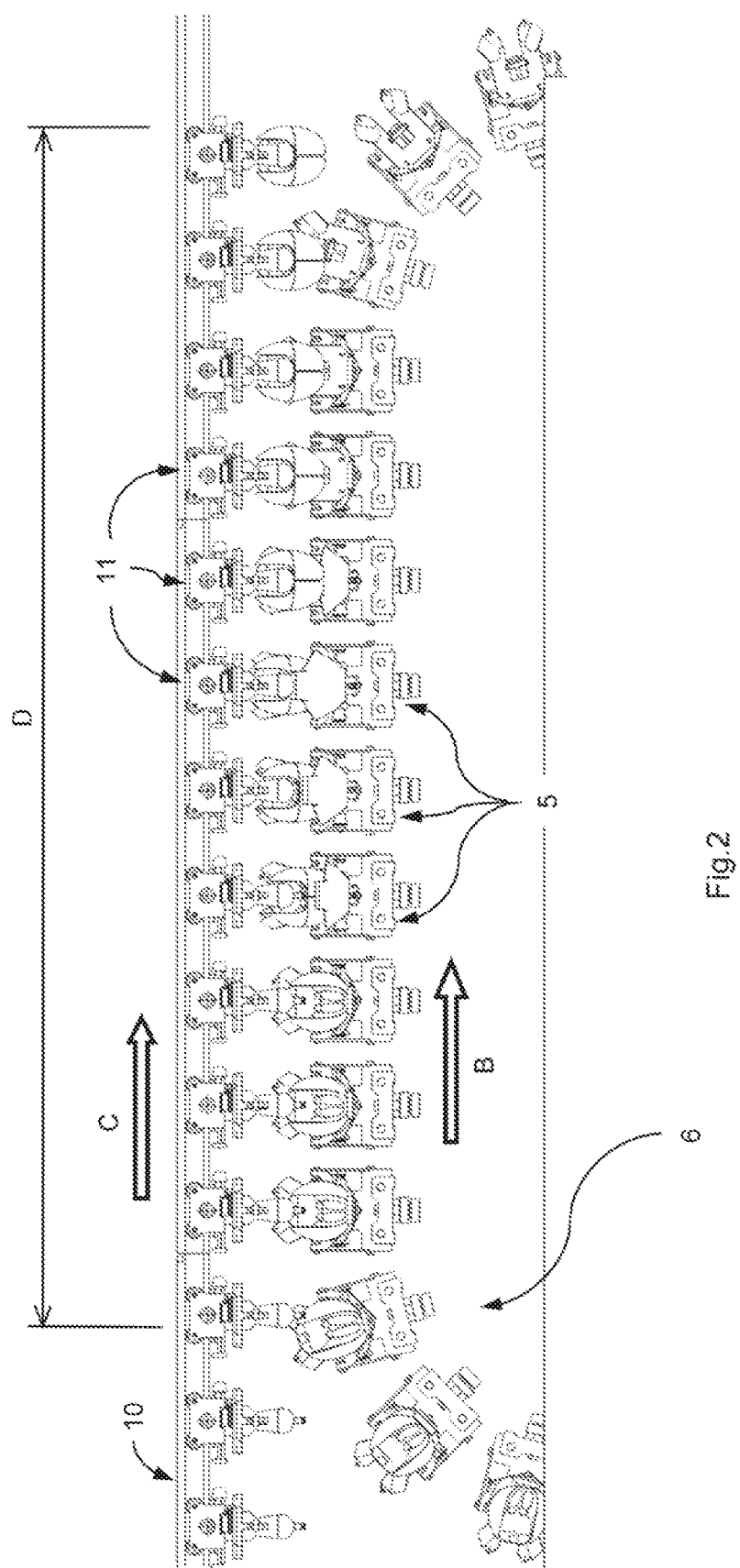
FIG. 2 shows in top view a processing line adjacent to a conveyor line of an exemplary system according to the invention.

FIG. 2 shows a detail of the exemplary system of the invention in which the conveyor line 6 with the receptacles 5 moves closely adjacent to the processing line 10 with the carriers 11. It will be appreciated from this FIG. 2 that in the input station 4 each carrier 11 in the processing line 10 has a corresponding receptacle 5 in the conveyor line 6 and vice versa.

Figure 5:
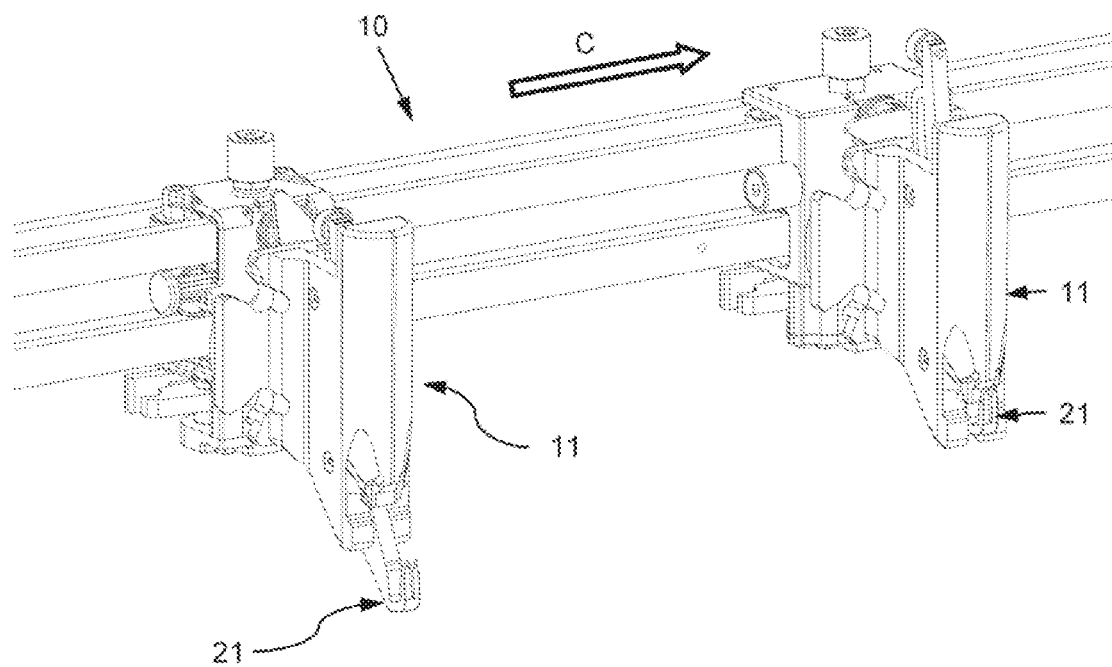
FIG. 5 shows two exemplary carriers in the processing line, one carrier with a lowered mounting hook, and one carrier with a retracted mounting hook.

FIG. 5 illustrates that in the region where placement of poultry front halves 3 in the processing line 10 occurs, each carrier 11 in the processing line 10 can be oriented vertically with an up-and-down movable mounting hook 21 at a lower part of the carrier 11. The carrier 11 on the left in FIG. 5 shows the mounting hook 21 in a lower position in which it can receive a poultry front half. The carrier 11 on the right in FIG. 5 shows that the mounting hook 21 is retracted, which corresponds with the situation that the poultry front half 3 is clamped on the carrier 11.

With reference to FIG. 4 it is shown that the receptacles 5 in the conveyor line 6 are also movable up-and-down. FIG. 4 shows the movement of the receptacles 5 while they are moving from the input station 4 towards and alongside the processing line 10 with the carriers 11, in particular in the region D indicated in FIGS. 1A, 1B, 2 and 4. The processing line 10 with the train of carriers 11 and the conveyor line 6 with the train of receptacles 5 as shown in FIG. 4 are synchronized to move at the same speed to enable the transfer of the poultry front halves 3 from the receptacles 5 to the carriers 11.

FIG. 4 first shows that with the receptacles 5 slanted towards the (not shown) transport line for supply of the poultry front halves, the poultry front halves 3 are received in the receptacles 5 and then transferred to region D where the receptacles 5 are tilted so as to arrange that—as an example—the receptacle 5' with the poultry front half 3 received therein is moved from a position below the corresponding carrier 11 in the processing line 10 to an upper and highest position. This occurs at a position in the line indicated with arrow E, and that during the movement of the receptacle 5' from a position below the carrier to the upper and highest position, the receptacle 5' is tilted towards the carrier 11' so as to engage the poultry front half 3 received in such receptacle 5' with the carrier 11'.

FIG. 4 further shows that thereafter the receptacle 5' is lowered and the poultry front half 3 is pressed down on the mounting hook of the carrier 11', which occurs at a position in the line indicated with arrow F. After the receptacle 5' is lowered and the poultry front half 3 is pressed down on the mounting hook of the carrier 11', the mounting hook 21 is moved upwards into a final position in which it clamps the poultry front half 3 on the carrier 11—these respective positions of the mounting hook 21 are shown in FIG. 5. During lowering of the receptacle 5' wherein the poultry front half 3 is pressed on the mounting hook 21 of the carrier 11, the mounting hook 21 pierces through a membrane connecting a keel bone and a wishbone of the poultry front half 3.

Figure 6A:
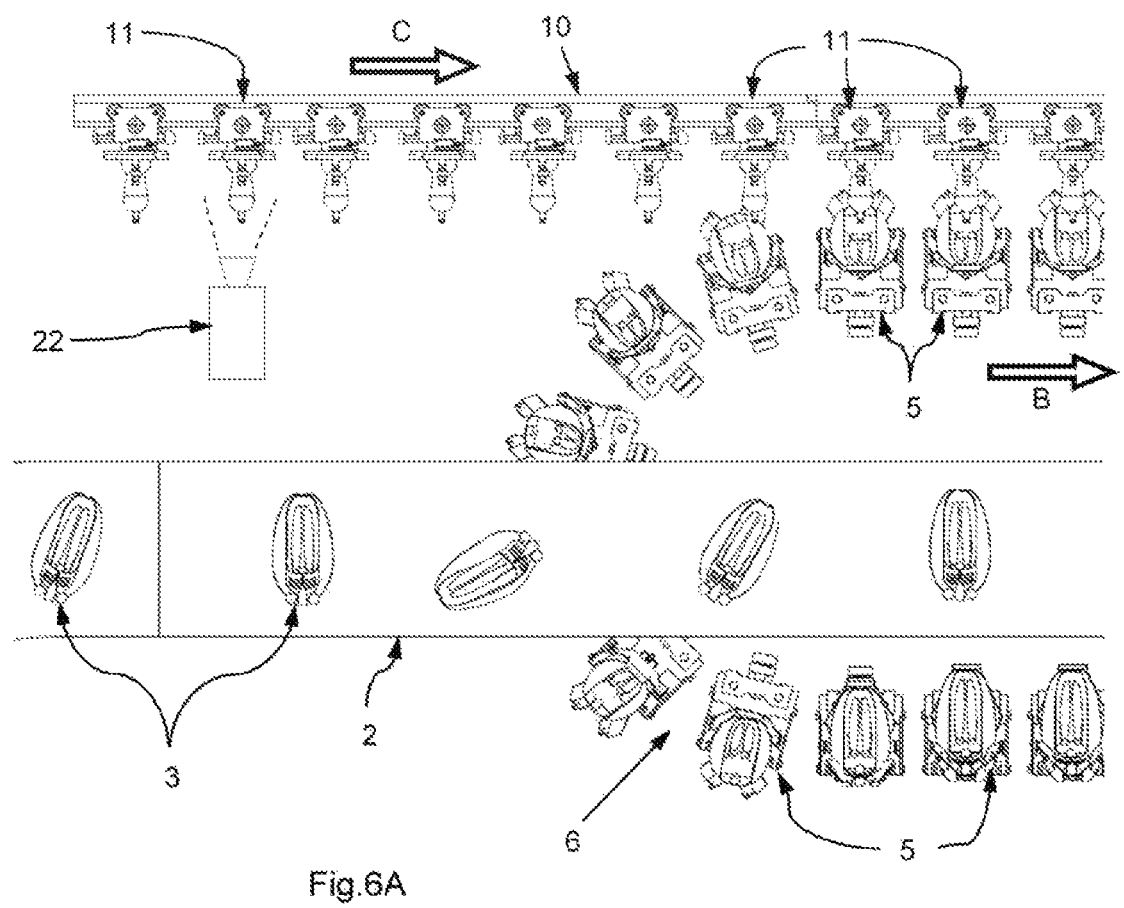
FIGS. 6A and 6B show another exemplary embodiment wherein the conveyor line with the receptacles progresses along the processing line with the carriers.
Figure 6B:
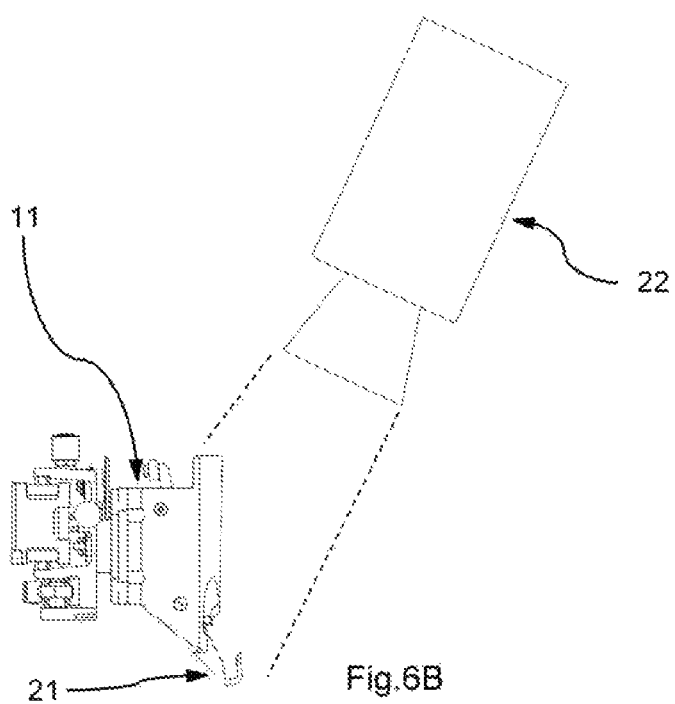

FIG. 6A shows an embodiment of the system of the invention wherein the system is provided with a second camera 22—shown from the side in FIG. 6B—to monitor whether a carrier 11 in the processing line 10 is empty or supports a poultry front half or a remainder of a poultry front half. The system is arranged to interrupt up-and-down movement of a corresponding receptacle 5 in the conveyor line 6 to prevent that the poultry front half in such receptacle 5 is moved into mounting position on the corresponding carrier 11, if the second camera 22 detects that the carrier 11 is not empty and already supports a poultry front half or a remainder of a poultry front half.

Although the invention has been discussed in the foregoing with reference to exemplary embodiments of a system and method according to the invention, the invention is not restricted thereto, and the system and method can be varied in many ways without departing from the invention. The discussed exemplary embodiments shall therefore not be used to construe the appended claims strictly in accordance therewith. On the contrary the embodiments are merely intended to explain the wording of the appended claims without intent to limit the claims to these exemplary embodiments. The scope of protection of the invention shall therefore be construed in accordance with the appended claims only, wherein a possible ambiguity in the wording of the claims shall be resolved using these exemplary embodiments.

What is claimed is:

1. A system for placement of a supply of poultry front halves in a processing line equipped with a train of movable carriers for the poultry front halves, the system comprising:
 a train of receptacles provided and movable in a conveyor line, wherein the receptacles are equipped to receive the front halves at an input station of the system, the conveyor line equipped to move the receptacles with the poultry front halves received therein from the input station towards and along the processing line with the carriers, and wherein the receptacles are equipped to transfer the poultry front halves onto the carriers in the processing line, wherein each receptacle comprises
  a breast support plate,
  a bottom plate,
  upstanding inserts rising up from the bottom plate distant from the breast support plate and defining a first slot between the inserts for receiving a backbone of the poultry front half received in the receptacle, wherein between each of the inserts and the breast support plate second slots provide room for breast meat of the poultry front half received in the receptacle, and
 wherein each carrier in the processing line is oriented vertically with an up-and-down movable mounting hook at a lower part of the carrier, and wherein for each carrier in the processing line, a corresponding receptacle in the conveyor line is movable up-and-down and tiltable so as to arrange that the receptacle with the poultry front half received therein is during operation moved from a position below the corresponding carrier in the processing line to an upper and highest position, and that during the movement of the receptacle from a position below the carrier to the upper and highest position, the receptacle is configured for tilting towards the carrier so as to engage the poultry front half received in such receptacle with the carrier, whereafter the receptacle is configured for being lowered and the poultry front half is pressed down on the mounting hook of the carrier.

2. The system according to claim 1, wherein the bottom plate comprises a third slot that connects with the first slot between the inserts, wherein the third slot is arranged to receive a neck of the poultry front half.

3. The system according to claim 1, wherein the input station comprises a transport line for supply of the front halves, and wherein the conveyor line with the receptacles is provided at least in part adjacent to and at least partly below the transport line for supply of the front halves, wherein at the input station the receptacles are slanted towards the transport line to assist in sliding of the poultry front halves from the transport line down into the receptacles.

4. The system according to claim 3, wherein for the input station where the receptacles are slanted towards the transport line, the breast support plate is configured to engage a frame of the transport line to be closer to the transport line than the inserts of the receptacles.

5. The system according to claim 1, wherein the system further comprises:
 a first camera for establishing a position and orientation of the poultry front halves on the transport line;
 a pick and place robot connected to the camera and configured for picking up the poultry front halves in accordance with the position and orientation of the poultry front halves as monitored with the camera, and placing the poultry front halves with a predefined orientation in the receptacles of the conveyor line, with the breast of the poultry front halves resting against the breast support plate of the receptacles.

6. The system according to claim 5, further comprising a second camera to monitor whether a carrier in the processing line is empty or supports a poultry front half or a remainder of a poultry front half, wherein the system is arranged to interrupt up-and-down movement of a corresponding receptacle in the conveyor line to prevent that the poultry front half in such receptacle from being moved into mounting position on the corresponding carrier, if the second camera detects that the carrier is not empty and already supports a poultry front half or a remainder of a poultry front half.

7. The system according to claim 1, wherein after the receptacle is lowered and the poultry front half is pressed down on the mounting hook of the carrier, the mounting hook is configured to move upwards into a final position in which it clamps the poultry front half on the carrier.

8. The system according to claim 1, wherein the breast support plate comprises an upper portion that is inclined towards the upstanding inserts opposite to the breast support plate.

9. The system according claim 1, wherein the processing line with the train of carriers and the conveyor line with the train of receptacles are synchronized to move at the same speed.

10. A method for placement of a supply of poultry front halves in a processing line equipped with a train of movable carriers for the poultry front halves, comprising:
providing that each carrier in the processing line is oriented vertically with an up-and-down movable mounting hook at a lower part of the carrier;
receiving the front halves in receptacles that are moving in a conveyor line;
moving the receptacles with the poultry front halves towards and along the processing line with the train of carriers;
providing that for each carrier in the processing line a corresponding receptacle in the conveyor line is moved up-and-down and tilted so as to arrange that the receptacle with the poultry front half received therein is moved from a position below the corresponding carrier in the processing line to an upper and highest position, wherein during this movement of the position below the carrier to the upper and highest position, the receptacle is tilted towards the carrier to arrange that the poultry front half received in such receptacle engages the carrier, whereafter the receptacle is lowered and the poultry front half is pressed down on the mounting hook of the carrier;
transferring the poultry front halves on-to the carriers in the processing line;
supplying the front halves with a transport line to an input station;
slanting the receptacles towards the transport line, and
sliding the poultry front halves from the transport line down into the receptacles.

11. The method according to claim 10, further comprising:
establishing a position and orientation of the poultry front halves on the transport line;
picking up the poultry front halves in accordance with the position and orientation of the poultry front halves on the transport line; and
placing the poultry front halves with a predefined orientation in the receptacles of the conveyor line with the breast of the poultry front halves resting against the breast support plate of the receptacles.

12. The method according to claim 10, further comprising:
providing that after the receptacle is lowered and the poultry front half is pressed down on the mounting hook of the carrier, the mounting hook is moved upwards into a final position in which it clamps the poultry front half on the carrier.

13. The method according to claim 12, further comprising:
providing that during lowering of the receptacle wherein the poultry front half is pressed on the mounting hook of the carrier, the mounting hook pierces through a membrane connecting a keel bone and a wishbone of the poultry front half.

14. The method according to claim 13, further comprising:
providing that the processing line with the train of carriers and the conveyor line with the train of receptacles are synchronized and move with the same speed.

15. The method according to claim 10, further comprising:
monitoring whether a carrier in the processing line is empty or supports a poultry front half or a remainder of a poultry front half; and
interrupting operation of a corresponding receptacle in the conveyor line to prevent that the poultry front half in such receptacle is moved into mounting position on the carrier, when the carrier is not empty and already supports a poultry front half or a remainder of a poultry front half.

* * * * *